Sept. 5, 1950  C. W. GENTRY  2,521,213
MACHINE FOR MAKING SANDWICHES
Filed Feb. 11, 1947  3 Sheets-Sheet 1

Inventor
Carlyle W. Gentry

By Clarence A. O'Brien
and Harvey B. Jacobson
Attorneys

Sept. 5, 1950  C. W. GENTRY  2,521,213
MACHINE FOR MAKING SANDWICHES
Filed Feb. 11, 1947  3 Sheets-Sheet 2

Inventor
Carlyle W. Gentry

By Clarence A. O'Brien
and Harvey B. Jacobson
Attorneys

Sept. 5, 1950    C. W. GENTRY    2,521,213
MACHINE FOR MAKING SANDWICHES
Filed Feb. 11, 1947    3 Sheets-Sheet 3
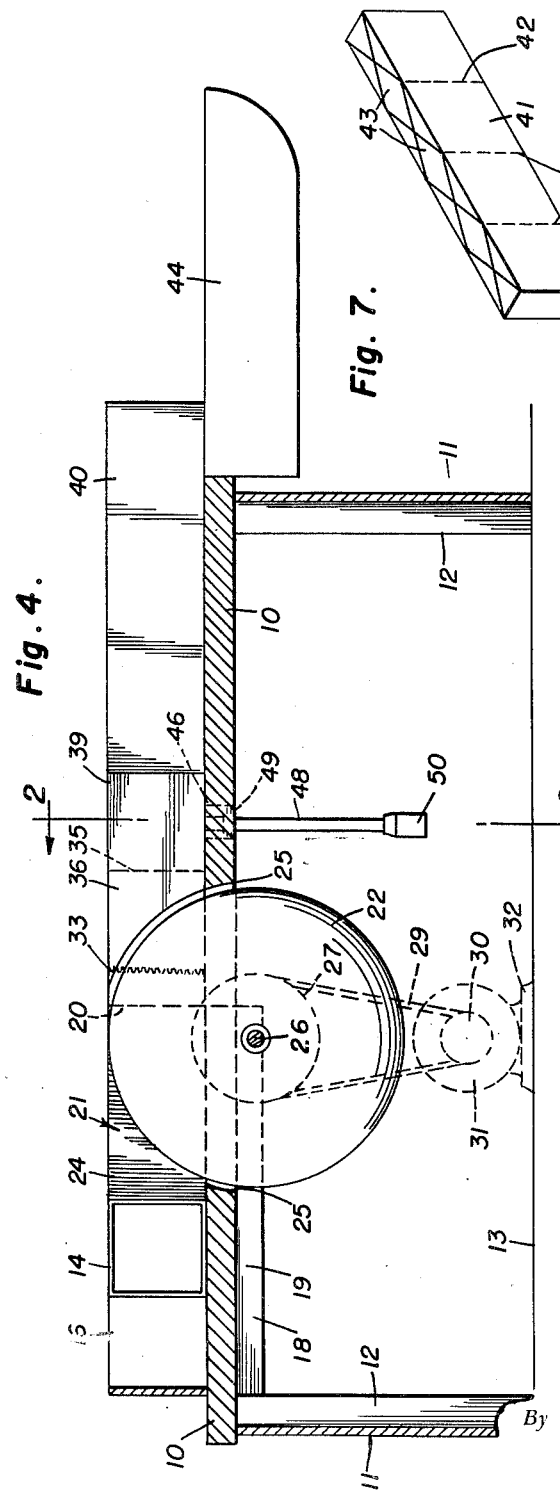
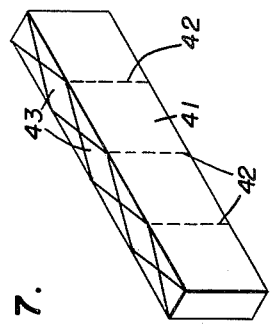
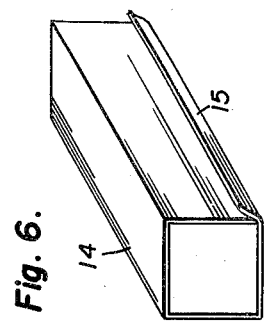
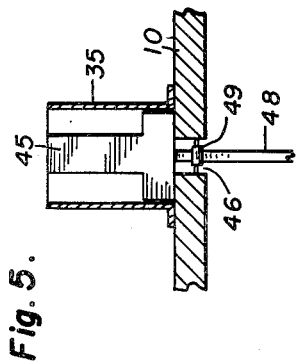
Inventor
Carlyle W. Gentry Patented Sept. 5, 1950

2,521,213

UNITED STATES PATENT OFFICE 2,521,213

MACHINE FOR MAKING SANDWICHES

Carlyle W. Gentry, Bluefield, W. Va., assignor to Gentry Corporation, Bluefield, W. Va., a corporation of West Virginia Application February 11, 1947, Serial No. 727,838

8 Claims. (Cl. 107—1)

This invention relates to a machine or apparatus for making such sandwiches, more particularly ice cream sandwiches.

The primary object of the invention is to produce sandwiches and deliver them to the consumer fully wrapped so that the edible part of the sandwich need not be touched by or come in contact with the hands of the dispenser.

Another object is to cut bars of sandwich filler into slices of appropriate thickness to be used between cakes or wafers as a filling for sandwiches.

A still further object is to apply cakes or wafers to opposite sides of the slices of sandwich filler in succession as they are cut, and to deliver the completed sandwiches into a suitable wrapper that will enable one or more sandwiches to be dispensed in fully wrapped condition without disturbing the other sandwiches contained therein.

Among its features this invention embodies a supporting surface, a cutting blade extending upwardly from said supporting surface, means to advance a bar of sandwich filler along the supporting surface into contact with the cutting blade to sever slices of sandwich filler from said bar and to advance such severed slices edgewise beyond the cutting blade and means on the supporting surface beyond the cutting blade to advance wafers into contact with opposite side faces of each slice of sandwich filler as it advances beyond the knife.

Other features include means to support a wrapper in extended position in alignment with the edgewise advance of the sandwiches.

Still other features include magazines, on the supporting surface adjacent opposite sides of the path of advance of the sandwich fillers, and means operable longitudinally of the magazines to feed wafers toward the path of advance of the sandwich fillers and means actuated in unison with the sandwich filler bar advancing means to move wafers out of their respective magazines in unison with the movement of a slice of sandwich filler.

Figure 4 is a longitudinal sectional view taken on the line 4—4 of Figure 1;

Figure 5 is a detail vertical sectional view taken on the line 5—5 of Figure 2;

Figure 6 is a perspective view of an ice cream container in which the semi-fluid or semi-frozen ice cream or other material is deposited for hardening or freezing in a hardening room or the like and having means forming a tab for removing a wrapper formed thereby when dispensed or purchased;

Figure 7 is a perspective view of a container adapted to receive a number of the sandwiches and to be separated into individual sandwiches fully wrapped, when dispensed, as delivered from the machine or apparatus;

Figure 1:
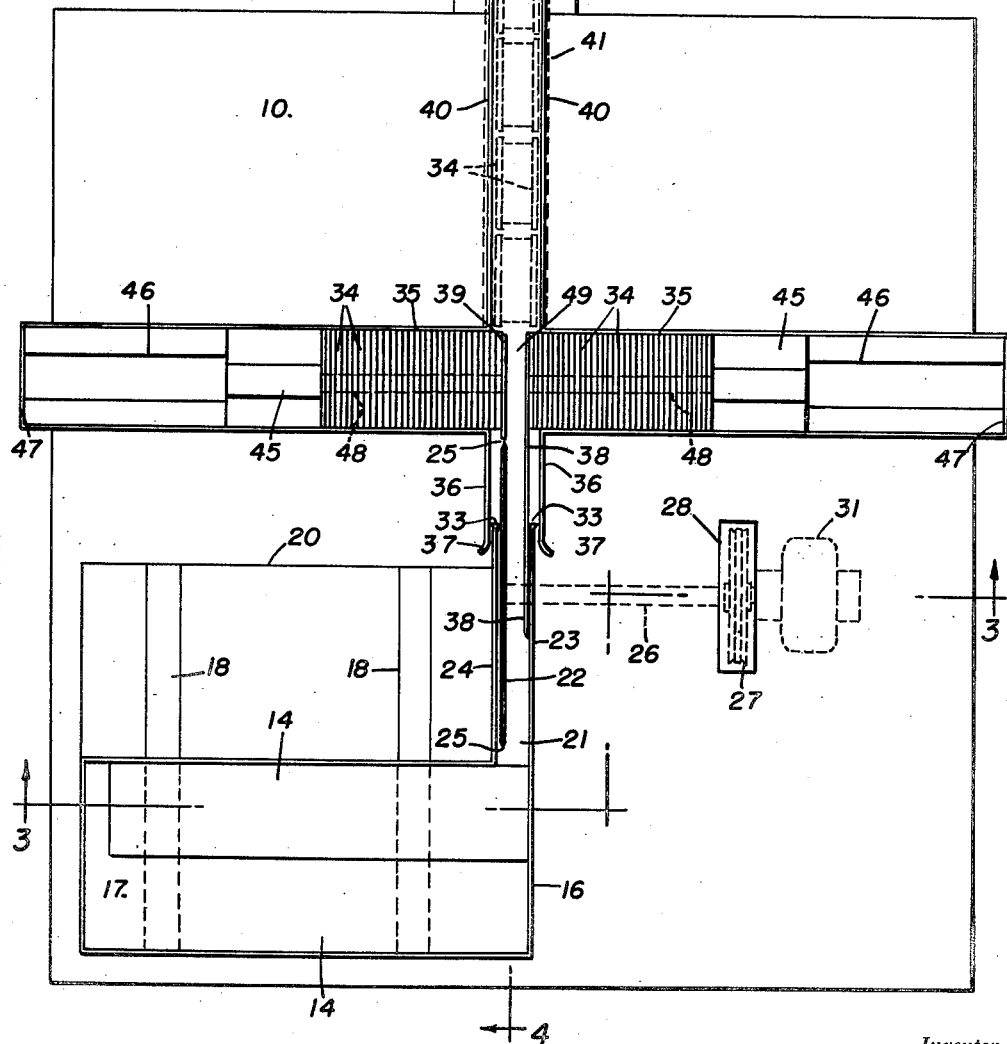
Figure 1 is a top plan view of a machine or apparatus for making ice cream sandwiches in accordance with the invention.

Referring to the drawings in detail, in which like reference characters designate corresponding parts throughout the several views, it may be pointed out that the ice cream or other filler is discharged from the freezing machine into containers which are open at the ends and supported on end to close the same, by means of suitable hinged boards or other horizontal supporting surfaces with frames for mounting the containers in spaced relation to prevent adherence therebetween and may be in the form of an endless belt or conveyer. The ice cream in a semi-fluid or semi-frozen condition may be run into the containers while supported on end, and after being filled, they are run into a cold storage or hardening room for hardening. These containers have a loose or free edge strip and the containers with the frozen ice cream therein is severed into slices by feeding the same to a cutting blade, which cuts the same in slices of uniform thickness due to the advancing of the end of the container which is to be severed and the guiding thereof in its movements towards the cutting blade, after which the cut slices so severed, are fed forward between magazines or stacks of horizontally arranged cakes or wafers, between which the slices of ice cream are fed as wrapped around the edge thereof or peripherally, to receive the cakes or wafers upon opposite sides thereof for adherence thereto, and then fed forward into a wrapper or container perforated at regular intervals with scored lines, so that the individual sandwiches may be separated for consumption, all without contact with the human hand of the operator or dispenser, thereby insuring a clean and sanitary condition for the product as delivered to the purchaser.

As illustrated, the machine comprises a horizontal support or table 10 constituting a working surface, positioned at the top of a case or cabinet 11 which may be of metal or otherwise, or simply a table provided with corner supports or legs 12. A corner support may constitute the frame of the case or cabinet 11 extending to the base or floor 13, which may be the bottom of the case or cabinet. A suitable number of elongated rectangular open ended containers 14 of waxed paper or other suitable paraffin material, is provided for receiving the ice cream or filling, which may be in a semi-fluid or semi-frozen condition from the automatic freezer and run into the container suitably supported on one end upon a wood or other frame, which may be constructed of a series of hinged sections having frames for receiving the containers 14 in spaced relation, to prevent adherence thereof to each other. One edge of the strip forming the container is free, as indicated at 15, adjacent one corner, so as to provide tabs when the containers are severed into sections of appropriate thickness forming slices of the ice cream or filler therein, after the containers filled with ice cream closed at the bottom by the support and open at the top through which the same are filled, is placed in a suitably cooled hardening room at a low temperature. These containers are arranged one behind the other horizontally, within a suitable rectangular frame 16 upon the table or horizontal support of the case or cabinet, or the table, as the case may be, and arranged to slide at its bottom 17, upon the supporting surface or table 10, as by means of parallel guide grooves 18 provided therein and into which guiding projections or tongues 19 of the frame 16 project so as to slide forward into feeding position for cutting the container and ice cream contained therein into appropriate slices of suitable thickness. The frame or tray 16 is designed to be moved within a suitable guideway or area 20, and at the inner side, is formed with a narrow channel 21 forming an exit opening and constituting a means for determining the width of the slice to be severed successively from the containers 15 together with the filling such as ice cream contained therein as the containers in and with the frame 16 are moved forward to sever the end thereof in rear of the channel 21 and then advanced endwise for the next slicing operation.

For this purpose, a circular cutting blade or disc 22 is mounted to extend into the channel 21 spaced from its outer wall 23 and adjacent the inner wall 24 thereof with the cutting edge in close proximity to the outlet of the frame 16. The cutting blade extends up through a slot 25 in the horizontal support or surface 10 and above the latter. It may be driven in any suitable way so as to be rotated at the proper speed, and is shown fixed to a shaft 26 arranged horizontally beneath the table or horizontal working surface 10 in suitable bearings therebeneath, and carries a pulley 27 fixed to the shaft and accommodated in an opening in the table if desired as indicated at 28. An endless drive chain or belt 29 is trained around the pulley or sprocket wheel 27 and around a smaller pulley 30 fixed to one end of the rotor shaft of a motor 31, preferably an electric motor, supported at its base 32 upon the base or bottom 13 of the case or cabinet 11, or upon the floor, as shall be found desirable and expedient. The walls 23 and 24, thus form guides for the severed portions of the container 14 and the contained ice cream or other filler and may be corrugated if desired, to prevent adherence of the waxed or paraffin wrapper of the container 14 around the ice cream or filler from adhering thereto. The forward ends of the walls 23 and 24 may be corrugated and spread apart, as indicated at 33, by severing the ends at regular intervals horizontally by means of cuts or slits entering horizontally into said edges, and bending the intermediate tongues thus formed in alternate opposite directions, to form widened end portions adapted when moved forwardly, to eject cakes or wafers individually as indicated at 34, from oppositely arranged magazines 35 disposed transversely thereof across the horizontal support or table 10 and constituting separate containers or magazines for the cakes or wafers upon opposite sides of the channel through which the cut portions or slices of the ice cream and wrapper formed by the severed portions of the containers 14, are fed. Also, suitable means may be provided for controlling the operation of the motor 31, which may be an electric motor, with suitable feed control means, although this may be governed by the gearing or operative drive connections between the pulleys 27 and 30.

Figure 9:
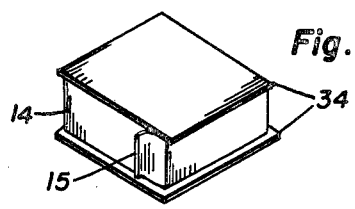
Figure 9 is a perspective view of an ice cream sandwich with the outer container removed and showing the original container around the ice cream or the like with a tab for easily removing the same for eating.

The widened ends 33 of the walls 23 and 24 at the discharge end of the channel 21, with the cutting blade 22 positioned against the inner side or in close proximity to the wall 24, operate between the cutting blade 22 at one side and an adjacent wall 36 having an out turned end 37 arranged upon the supporting surface or table 10, and at the opposite side, the corresponding wall similarly numbered, operates outwardly of the wall 23, which moves between the adjacent wall 36 and an extension guide 38 extending into the channel 21 beyond the axis of rotation of the cutting blade 22. The guide 38 is positioned in spaced parallel relation to the walls 23 and 24 opposing the cutting blade 22 and within the wall 23, which it overlaps beyond the axis of rotation of the cutting blade 22 and with the cutting blade disposed within and adjacent to the wall 24, while the walls of the channel 21 extend between the receiving guides 36 and the wall 33 has a short wall 39 opposing the same in spaced parallel relation, and in alignment with the plane of the cutting blade 22 as clearly shown in Figure 1 of the drawings. That is, the wall 39 extends in alignment with the cutting blade at its tapered peripheral cutting edge, so that as the portions of the container and ice cream or other filler therein are severed by the cutting blade and moved forward by the cutting operation and sliding of the containers into the cutting edge of the blade, the slices are fed between the blade and the wall 38, so that the widened edges or vertical ends of the guides and walls 23 and 24 serve to engage the edges of the cakes or wafers disposed in the magazines 35 for the purpose of pushing the same forwardly with the wrapped ice cream or filler from between the guides or walls 38 and 39, to positions upon opposite sides of the severed slices of ice cream peripherally wrapped as described on its edge, for the purpose of discharge as a sandwich, as indicated in dotted lines in Figure 1 of the drawings. Thus, the walls 23 and 24 also serve for the purpose of discharging the cakes or wafers 34 from the magazines or holders 35 supported on edge therein against one another. The cakes together with the intermediate layer or filler of ice cream or other filling, is thus fed forward between the side walls 40 of a guide member of suitable length, supported on the surface or table 10 and projecting slightly beyond the same if desired. As illustrated, this guide may accommodate any number of the sandwiches, such as four, and serve as means for feeding the same into a container 41 scored or perforated at equal spaced parallel intervals as indicated at 42, to form waxed, paraffin or other paper wrappers for the sandwiches as fed forward after being sliced and joined with the cakes or wafers 34 upon opposite sides thereof, and preferably projecting at their edges from the intermediate layer or filler of ice cream or other suitable material, as indicated more appropriately in Figures 1 and 9 of the drawings. In other words, the cakes or wafers forming the outer layers of the sandwiches, are preferably larger slightly than that of the slices of ice cream or other filler between said cakes or wafers wrapped by the severed portions of the container 14 by means of the cutting blade 22. Thus, the loose strip 15 forms tabs, by which the edge or peripheral wrapping of the filler between the cakes or wafers, may be readily torn free and removed from the sandwich for consumption after removing the individual wrappers produced by the container 41 at the severed portions determined by the scored or perforated lines 42 thereof. If desired, one narrow edge of the container 41 at the top, may be provided with diamond or other shaped openings 43 formed by joined triangular openings or recesses in the ends and top of each container section, so that the contents are rendered more easily visible and tearing apart of the sections facilitated. Obviously, the container 41 is also open ended like the container 14 but entirely envelopes the sandwich including the wrapped filler of ice cream sliced into sections as described, with the cakes or wafers upon opposite sides thereof and adhering thereto, as distinguished from the wrapper 14, which merely extends around the edge portion or peripheral edge of the ice cream or other intermediate slice of filler forming part of the sandwich as severed from the container 14 by the cutting blade 22. This form of the product, namely the sandwich itself, without the wrapper formed by the container 41 or the individual sections thereof severed as described, is shown in Figure 9 of the drawings, from which it will be seen that the cakes 34 are mounted upon and adhere to opposite sides or faces of the slices of ice cream and severed portions of the container 14 disposed around the same, so that the free edge strip 15 will form a tab by which the same may be removed after removing the sandwich from the sections of the container 41 severed along the scored or perforated lines 42 as dispensed, or by the purchaser, so that the edible portion of the sandwich does not come into contact with the hand except that of the consumer. The sandwiches by not coming in contact with human hands, is therefore delivered in a clean and sanitary condition for which there can be no reproach.

In order to fill the wrapper or container 41, the latter may be slipped over the guide 49 and in order to do so, may be mounted upon an inverted U-shaped or channel shaped support 44 mounted upon the discharge end of the supporting surface or table 10 in alignment with the guide 49 which projects over the support 44 to facilitate the positioning of the wrapper or container 41, to receive the formed ice cream sandwiches therein endwise until in proper alignment or registry with the sections thereof to be torn off or severed for individual use.

Figure 2:
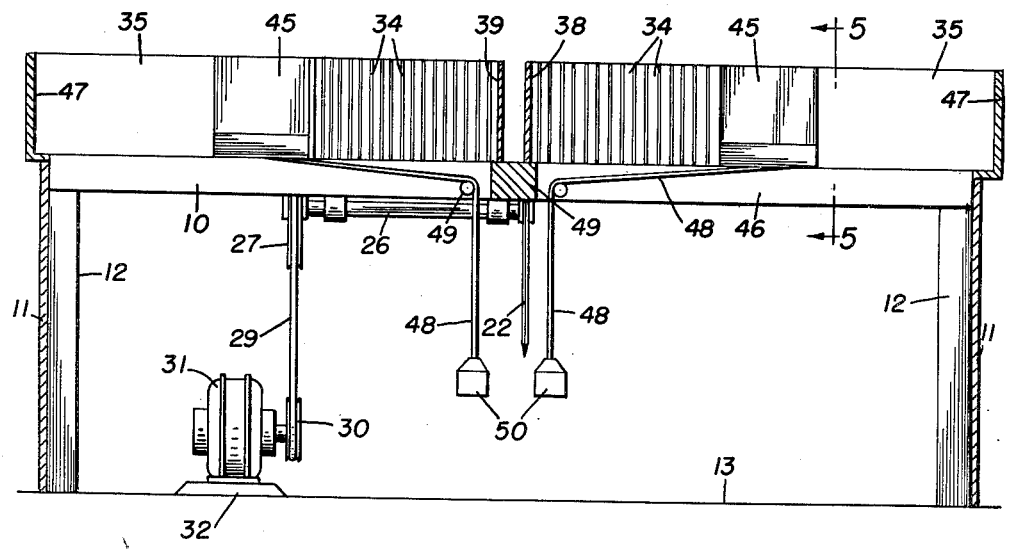
Figure 2 is a vertical cross sectional view taken on the line 2—2 of Figure 4.
Figure 3:
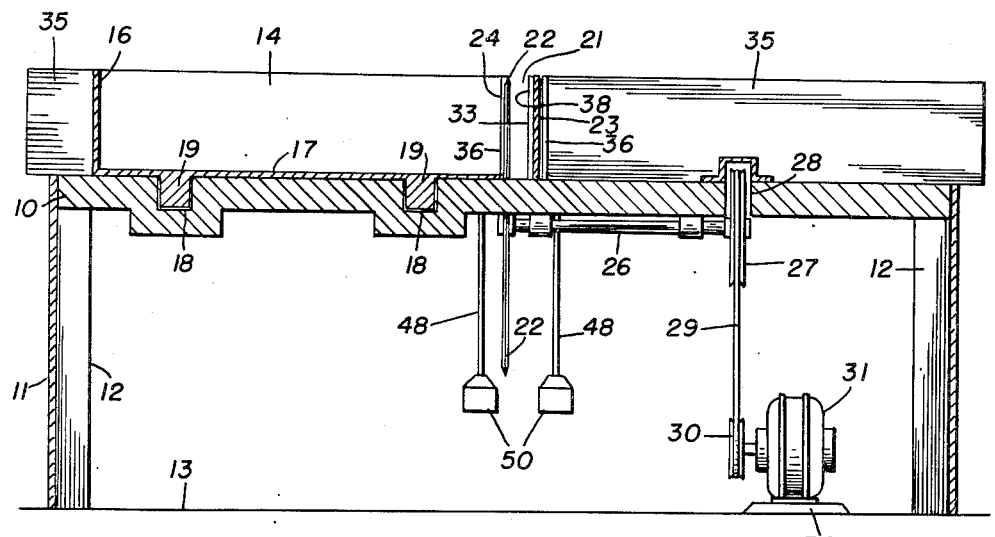
Figure 3 is a similar transverse vertical sectional view taken on the staggered section line 3—3 of Figure 1.
Figure 8:
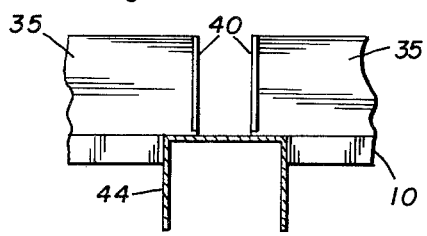
Figure 8 is a sectional view taken on the line 8—8 of Figure 1.

In order to feed the cakes or wafers 34 in the magazines 35 toward each other in opposite directions against the guides 38 and 39 so as to be ejected by the sliding pushers 33 at the widened edges of the inner ends of the walls and guides 23 and 24 at the discharge end of the channel 21, as moved forwardly during the severing of the slices, said cakes or wafers 34 are mounted between or intermediately of pressure blocks 45 disposed in the magazines 35 which form guides therefor, said pressure blocks being of inverted T-shaped cross section as more particularly shown in Figure 5 of the drawings and disposed over longitudinal slots extending transversely of the table or horizontal supporting surface 10, as indicated at 46 from the outer closed ends 47 of the magazines 35. Tapes or flexible sections of belting or other strips 48 are anchored to the respective pressure blocks 45 which are guided by the sides of the magazines 35 due to the inverted cross heads thereof being disposed to fit loosely between said sides and move upon the surface or table 10. Obviously the belts or strips formed by the tapes 48 may be secured to the pressure blocks or plungers 45 in any suitable way, as indicated in Figure 2 of the drawings and extend inwardly in opposite directions through the slots 46 and over idler rollers or pulleys on opposite sides of the intermediate supporting wall portions 49 of the table top or surface 10 between said slots 46, so as to extend downwardly or hang in depending relation, for connection to weights 50 at the lower ends thereof, for giving the necessary pressure for automatically feeding the rows or stacks of cakes or wafers forwardly in the magazines to opposite sides of the slices of ice cream fed therebetween and ejected from opposite sides of the guide formed by the walls 38 and 39 in the successive slicing operations in the manner clearly shown in Figure 1 of the drawings.

From the foregoing, it will be seen that the semi-frozen or semi-fluid and flowable soft ice cream mix, as delivered from a freezer, usually a freezing machine at low temperature, as employed in connection with the manufacture of ice cream, is delivered into a number of the containers 14 suitably supported in a rack or frame, or a number thereof hinged together to constitute an endless conveyer or belt, so that the lower supported ends thereof are closed and the upper ends open to permit the ice cream mix to readily flow into the same. Not only does the wrapper protect the ice cream, but prevents contact thereof with the hands of the operators or dispenser and forms a tab, for opening the wrapped finished sandwich. After the containers are stacked in the hardening rooms and cooled to the proper hardening point, and frozen in the containers as described, the latter are ready for the machine. These containers, of which two are shown, are supported within the frame 16 and simply moved forward so that one end is severed by the cutting blade 22. As successive portions of the ice cream within the containers 14 are severed, by moving the containers and ice cream fillers therein endwise in the cutting position successively as the ends are severed into slices, the said severed portions or slices are slid forward in the guideway and subsequently between the cakes or wafers which are moved against the opposite sides thereof, from the magazines under pressure, fed by the weight 50, causing inward movement of the pressure blocks or plungers 45 in moving toward each other. They are then fed upon the table or support 10 within the guide 40, which is adapted to receive the wrapper or container 41 partially or entirely thereover by reason of the spaced relation of the bottom or bottom edges of the guide 40 or walls thereof; of the supporting surface or table 10, or the support 44 extending therefrom in alignment therewith and co-extensive therewith as described, from one end of the table so that the sandwiches wrapped around the edge by the wrappers produced by the severed portions of the container 14, are fed into the wrapper or containers 41 and may be delivered in any suitable number, such as four, with the sandwiches therein. This is facilitated by the fact that the wrappers or containers 41 are open at the ends and may be formed of any suitable length, so as to be severed or torn off in any desired number and then the individual wrappers torn off at the sections produced by scored lines or perforations 42, for individual use or consumption. Thus, the purchaser obtains from the machine or apparatus, the completely wrapped sanitary sandwich untouched by human hands, and after removing the wrapper or container 41 thereon, then removes the edge wrapper 14, this being facilitated by the tab 15 which permits the same to be readily torn loose, so that the sandwich may then be consumed by the purchaser. Obviously, the guides which are corrugated to prevent adhesion of the ice cream as fed forward between the guides, are part of a carrier, which serves to guide the slices of ice cream forward between the cakes, for adhesion of the latter to opposite sides of the ice cream, and also serve as means for pushing the cakes out of the container in the form of a completed sandwich. The walls or guides 38 and 39, serve to keep the ice cream and cakes separated until the ice cream and cakes pass the cake carrier, at which point the said sandwich is completed and made to be wrapped by moving the same into the wrapper or container 41, thus preventing any possible obstruction to the feeding of the slices of ice cream forming the filler and the cakes upon opposite sides thereof until brought together for adhesion and feeding forward as a complete sandwich to be wrapped as described. Thus, the complete package contains the sandwiches wrapped around the edge by the wrapper or container 14 sliced as described with the filler of ice cream or the like between the cakes or wafers as described, and the filler or ice cream retained intact by the sliced sections of the container or wrapper 14 with the tabs 15 formed by the cut sections of the free edge strip 16 thereof, and if desired, subsequently fed into the wrappers or containers 41 to be cut into individual sections of equal length, for individual service for each sandwich, by merely tearing the wrapper 41 along the scored or perforated lines 42 between the sandwiches, which further facilitates the separation. Thus, not only is a novel apparatus or machine provided for making the ice cream sandwiches or the like, but also a novel product, namely the sandwich itself, and the method for making the same, permitting the same to be turned out economically and in a clean and sanitary condition for consumption.

While in the foregoing there has been shown and described the preferred embodiment of this invention, it is to be understood that minor changes in the details of construction, combination and arrangement of parts may be resorted to, without departing from the spirit and scope of the invention as claimed.

What I claim is:

1. A machine for making ice cream sandwiches comprising a horizontal support having a frame for receiving containers with ice cream, said frame having extension guides; a cutting blade operating in said extension guides to sever the container of ice cream into slices when moved against the blade and to feed the same forwardly, as cut successively, magazines in opposed relation containing cakes engaged by the guides when moved forwardly to sever the container and ice cream in slices and to feed the same upon opposite sides of the slices, and means for moving said cakes against the guides.

2. A machine for making ice cream sandwiches comprising a supporting surface, a frame thereon and movable to receive and advance containers with ice cream therein; said frame having guides extending therefrom forming a reduced channel, a cutting blade operating in said channel, to sever the container into slices with the ice cream therein and feed the same forwardly as successively cut, said guides being disposed upon opposite sides of the slices, magazines containing cakes disposed to feed the same toward each other upon opposite sides of the slices as fed forward, said guides having engaging ends to move the cakes forwardly with the slices for adherence to opposite sides thereof, and means for moving the cakes inwardly toward each other to the slices as advanced.

3. Apparatus for making sandwiches which includes a supporting surface; a cutting blade extending upwardly from said supporting surface; means to advance a bar of sandwich filler along the supporting surface into contact with the cutting blade to sever slices of sandwich filler from said bar and to advance such severed slices edgewise to a point beyond the cutting blade, and means on the supporting surface beyond the cutting blade to advance wafers into contact with opposite side faces of each slice of sandwich filler as it advances to said point beyond the cutting blade.

4. Apparatus for making sandwiches which includes a table; spaced aligned wafer magazines on said table, means to advance wafers toward adjacent ends of the magazines, a cutting blade near the adjacent ends of the magazines, means to advance pre-formed bars of sandwich filler along the table toward the knife to sever slices of sandwich filler from the bars, said bar advancing means also serving to advance the slices so severed between adjacent ends of the magazines, and means on the bar advancing means to move a wafer out of each magazine with the advance of a slice of sandwich filler beyond adjacent ends of the magazines.

5. Apparatus for making sandwiches which includes wafer magazines mounted in spaced longitudinal alignment, a cutting blade mounted near one side of the adjacent ends of the magazines, means movable in a path which lies perpendicular to the axis of the magazines to advance a preformed bar of sandwich filler against the cutting blade to sever slices of sandwich filler from said bar and to advance a slice so severed through the space between the magazines, and means movable with the bar advancing means to eject a wafer from each magazine as a slice of sandwich filler advances through said space.

6. Apparatus for making sandwiches which includes wafer magazines mounted in spaced longitudinal alignment, a cutting blade mounted near one side of the adjacent ends of the magazines, means movable in a path which lies perpendicular to the axis of the magazines to advance a preformed bar of sandwich filler against the cutting blade to sever slices of sandwich filler from said bar and to advance a slice so severed through the space between the magazines and means movable with the bar advancing means to eject a wafer from each magazine as a slice of sandwich filler advances through said space, and means on the side of the magazines remote from the cutting blade to move the wafers into contact with opposite sides of a slice of sandwich filler as it moves beyond the magazines.

7. In sandwich making apparatus a table, a pair of spaced aligned wafer magazines mounted on the table, a cutting blade mounted on the table near adjacent ends of the magazines and in substantial alignment with one end of one of said magazines, a guide in spaced parallel relation to the cutting blade and in substantial alignment with the adjacent end of the other magazine, a frame movable on the table along a path which lies perpendicular to the magazines for moving a preformed bar of sandwich filler against the cutting blade to sever a slice of sandwich filling from the bar and advance said slice along the guide and through the space between adjacent ends of the magazines, and pushing heads on the frame and movable therewith for ejecting a wafer from each magazine as the slice moves through the space between the adjacent ends of the magazines.

8. In sandwich making apparatus, a table, a pair of spaced aligned wafer magazines mounted on the table, a cutting blade mounted on the table near adjacent ends of the magazines and in substantial alignment with one end of one of said magazines, a guide in spaced parallel relation to the cutting blade and in substantial alignment with the adjacent end of the other magazine, a frame movable on the table along a path which lies perpendicular to the magazines for moving a preformed bar of sandwich filler against the cutting blade to sever a slice of sandwich filling from the bar and advance said slice along the guide and through the space between adjacent ends of the magazines, pushing heads on the frame and movable therewith for ejecting a wafer from each magazine as the slice moves through the space between the adjacent ends of the magazines, and guides extending from the adjacent ends of the magazines opposite the first mentioned guide for moving the wafers into contact with opposite sides of the sandwich fillers.

CARLYLE W. GENTRY.

REFERENCES CITED

The following references are of record in the file of this patent:

UNITED STATES PATENTS

| Number | Name | Date |
|---|---|---|
| 1,482,138 | Moomjian | Jan. 29, 1924 |
| 1,497,863 | Lux et al. | June 17, 1924 |
| 1,755,699 | Loehr | Apr. 22, 1930 |
| 1,788,493 | Olschewsky | Jan. 13, 1931 |
| 1,798,560 | Saetta | Mar. 31, 1931 |
| 1,938,355 | Rose | Dec. 5, 1933 |
| 1,950,734 | Leaf | Mar. 13, 1934 |
| 2,136,505 | Hirschson | Nov. 15, 1938 |
| 2,154,697 | Phelps | Apr. 18, 1939 |
| 2,267,880 | Vogt | Dec. 30, 1941 |
| 2,385,583 | McLauchlan | Sept. 25, 1945 |